Inventor
Harold Winograd
By R J Falbrovski
Attorney

United States Patent Office 3,330,998
Patented July 11, 1967

3,330,998
CONTROLLED RECTIFIER CONTROL MEANS
Harold Winograd, Milwaukee, Wis., assignor to Allis-Chalmers Manufacturing Company, Milwaukee, Wis.
Filed July 31, 1964, Ser. No. 386,569
16 Claims. (Cl. 317—149)

This invention relates to control systems, particularly to control systems for timing the turning on of controlled rectifier devices at selected times to provide rectification and inversion of an alternating power source.

This invention provides control means for providing firing signals to groups of controlled rectifier devices over a range that adequately provides for operating the rectifier devices over the entire possible range of rectification and inversion. It also automatically provides means for controlling the firing angle to allow for commutation of the current between the phases and deionization of the rectifier devices. It has particular application in, but is not limited to, particle accelerators in which it may be used to control the current through the magnet windings of the magnets that are used to counteract the centrifugal force of the particles as they are accelerated. This is accomplished by controlling the current through the magnet windings to increase the current at a particular rate during the acceleration of the particles and to rapidly collapse the current following ejection of the particles from the acclerator.

The objects of this invention are to provide a new and improved control means for a rectification-inversion system, to provide control means that are accurate in operation and practical in application; to provide control means that automatically correct for varying current in the load system; to provide control means that automatically and simply compensate for commutation and deionization time; and to provide control means that are easily adaptable to effect operation of controlled rectifier devices over the full range of rectification and inversion operation.

Other objects and advantages will become apparent from the following detailed description of an embodiment of this invention.

Figure 1:
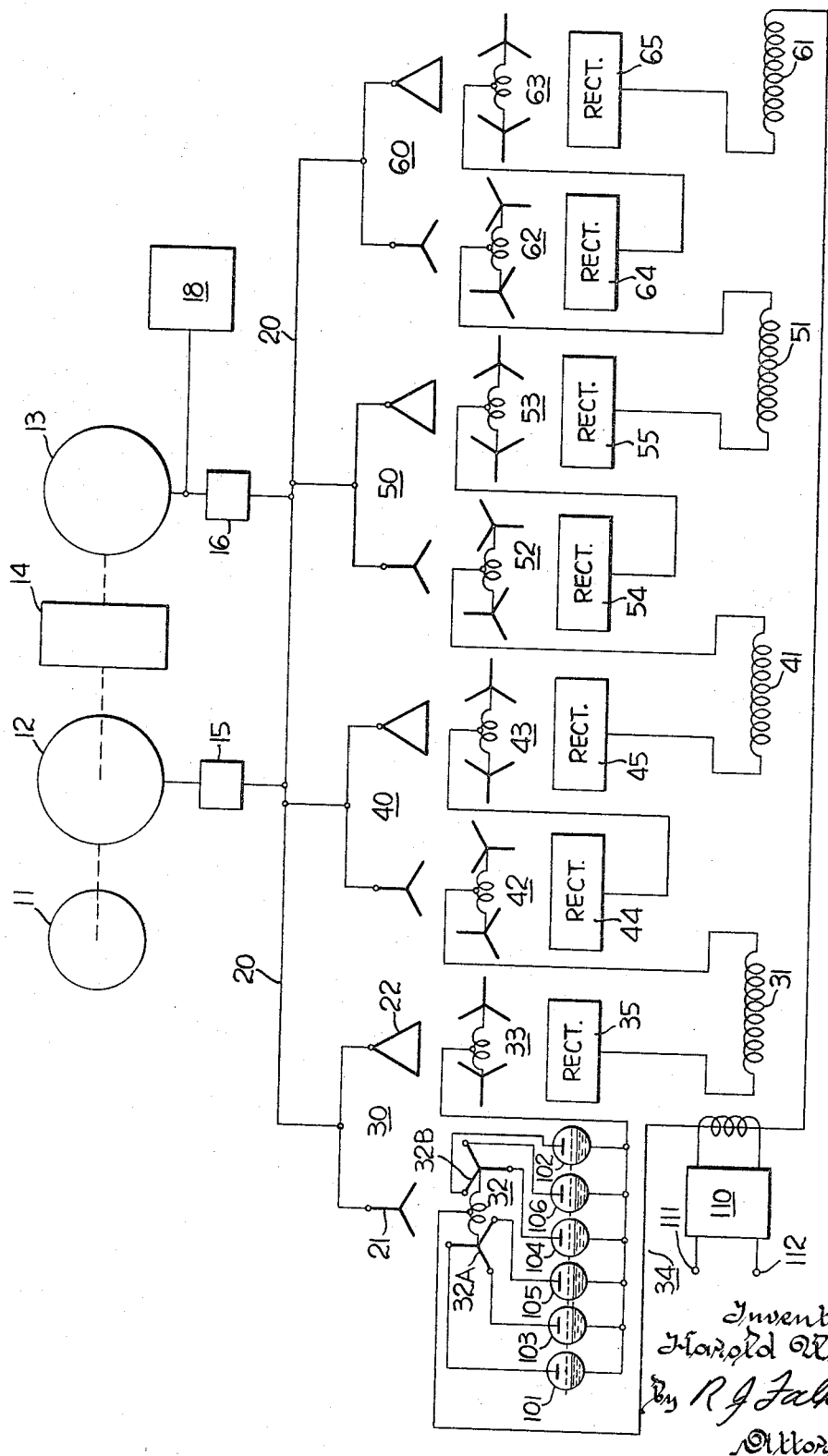
FIG. 1 is a drawing illustrating a power source, magnet windings and rectifier sections of a particle accelerator system with one of the rectifier sections shown in detail.

Referring to FIG. 1, a motor generator system having two parallelly connected synchronous generators 12 and 13, and a flywheel 14 are driven by a motor 11 to provide electrical energy to an alternating current bus 20 through circuit breakers 15 and 16. Bus 20 is connected to four sets of Y and delta connected primary windings of four transformer groups 30, 40, 50 and 60. Each of the primary windings, such as windings 21 and 22, is coupled to a six phase secondary winding, such as windings 32A and 32B, that is connected to a rectifier section. A twelve phase output is obtained from each group and the associated rectifier sections because of the phase displacement between each transformer group, such as windings 32 and 33 of group 30. Magnet windings 31, 41, 51 and 61; rectifier sections 34, 35, 44, 45, 54, 55, 64 and 65; and secondary winding systems 32, 33, 43, 43, 52, 53, 62, 63 are connected in series.

Figure 2:
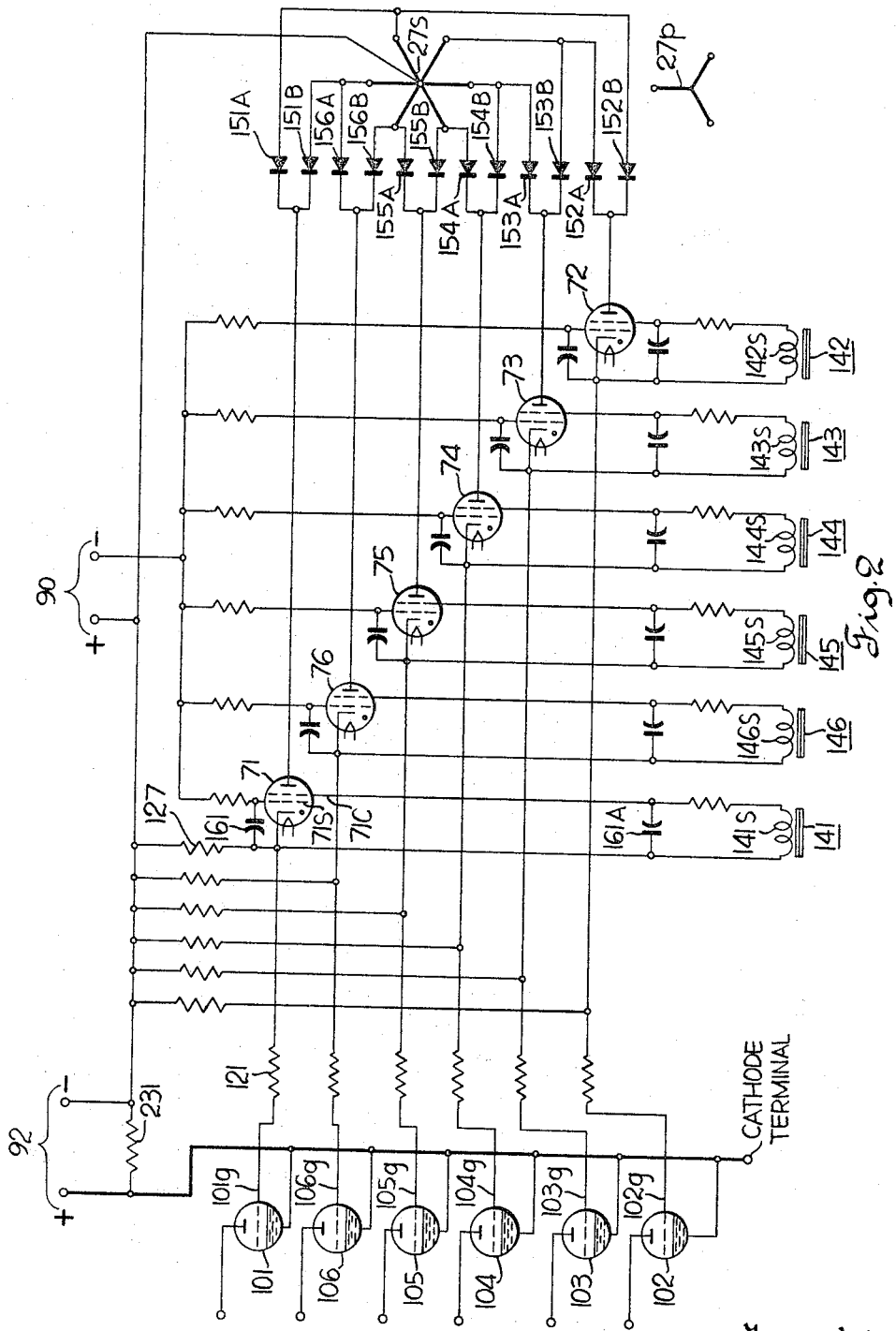
FIG. 2 is a drawing of a portion of the control means for the rectifier sections.

Rectifier section 34 is shown in detail. Each section has six controlled rectifier devices such as mercury arc rectifiers 101, 102, 103, 104, 105 and 106 each connected to a different phase of windwings 32A and 32B. (The control connections of the mercury arc rectifiers are shown in FIG. 2.)

A power source 18 for the control circuits receives power from one of the generators, generator 13, and provides energy for the primary windings of the transformers and all the control circuits used in the system. The voltages applied to the control circuits from source 18 in synchronism with the generator voltage and have a predetermined relationship to the voltages of the secondary windings of the power rectifier transformers. Power source 18 also provides the required step-down and insulating transformers and a wave filter for smoothing the voltage applied to some of the control circuits.

In the operation of a particle accelerator, it is necessary to build up and collapse the current through the magnets in the manner shown in curve 5a. The current is increased as shown by section M, is maintained at a relatively constant level (if desired) as shown by section N, and is collapsed to zero as shown by section L.

When particles introduced into the particle accelerator are accelerated, the magnetic field increases as a function of the current to provide a centripetal force to balance the centrifugal forces of the circular moving particles. After the particles are ejected the magnetic field is collapsed as rapidly as possible.

To provide the increasing current through the magnets, the potential across the magnet windings 31, 41, 51 and 61 is raised to a maximum voltage level F as shown in curve 5b by operating the mercury arc rectifiers are rectifiers. If a brief period of constant current such as shown by section N is desired, an intermediate voltage B is obtained by operating the mercury arc rectifiers to provide the reduced voltage. To collapse the magnet windings current to zero as rapidly as possible, the mercury arc rectifiers are operated as inverters to provide a negative voltage, voltage H, across the magnet windings. The negative voltage rapidly reduces the current, section L, curve 5a, to zero.

The portion of the control means that provides a gating pulse to the grids of the mercury arc rectifiers is shown in FIG. 2. Controlled rectifier devices such as thyratron tubes 71, 72, 73, 74, 75 and 76 are each respectively connected to control grids 101g through 106g of the mercury arc rectifiers. The thyratrons are sequentially turned on when pulses are produced across each respective winding of secondary windings 141s, 142s, 143s, 144s, 145s and 146s of transformers 141 through 146, respectively. Power for the control grid pulses is provided by a six phase secondary winding 27s (the voltages of which are shown vectorially) coupled to primary winding 27p which is connected to derive power from power source 18 (FIG. 1). Winding 27s is connected to the thyratrons, as shown, by diodes 151A through 156A and diodes 151B through 156B. Each thyratron is energized by two phases of winding 27s to assure an adequate potential level over the time that each thyratron may be fired. If necessary, additional sources derived from source 18 (FIG. 1) may be connected into this circuit to provide a longer phase related time for energization of the thyratrons.

A voltage is applied from a source 92 (across a resistor 231) to negatively bias the mercury arc rectifiers to assure that they will not turn on until the gating pulse is produced. Equalizing resistors such as resistor 127 connect the control circuits of the thyratrons to a common point.

A bias source 90 is applied to the secondary grids, such as grid 71s, of the thyratrons to negatively bias the thyratrons. Capacitors such as capacitors 161 and 161A are provided to aid in preventing triggering of the thyratrons in response to spurious signals or noise. Upon pulsing of a transformer, as for example transformer 141, a voltage pulse appears across associated secondary winding 141s and turns on associated thyratron 71 by making its control grid 71c sufficiently positive to overcome the blocking action of the negative bias from source 92 on grid 71s. Upon turning on of thyratron 71, current flows from winding 27s through diodes 151A and 151B, through thyratron 71 and through a current limiting resistor 121 to grid 101g to turn on mercury arc rectifier 101.

Figure 3:
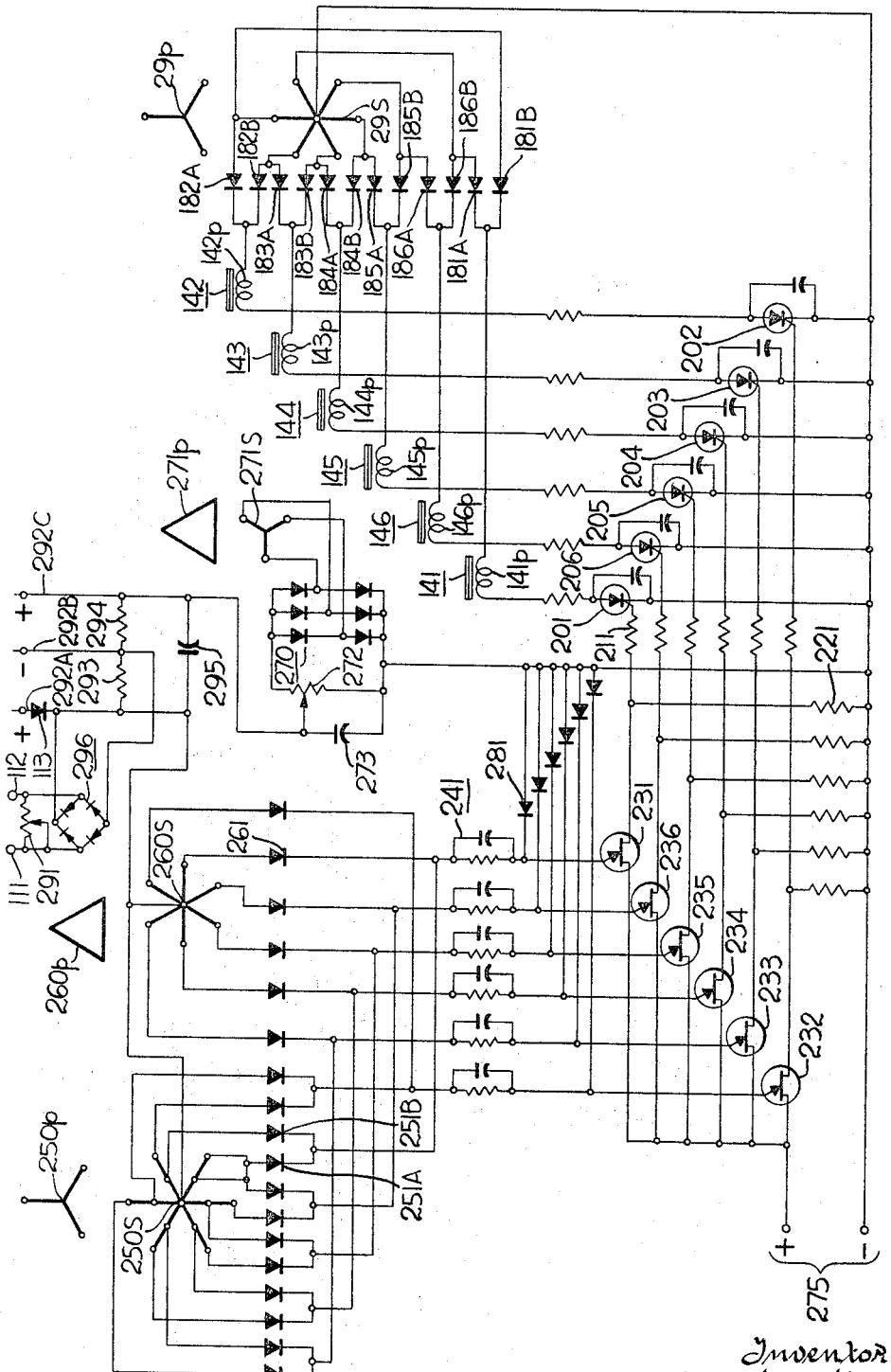
FIG. 3 is a drawing of another portion of the control means.

FIG. 3 shows means for producing the timed pulses in primary windings 141p through 146p (secondary windings 141s through 146s are shown in FIG. 2) to turn on the thyratrons at selected points in the cycles of their related phases. Switching devices such as silicon controlled rectifiers 201, 202, 203, 204, 205 and 206 are selectively turned on to sequentially connect primary windings 141p through 146p to a corresponding phase of a secondary winding 29s coupled to a primary winding 29p which is connected to receive power from source 18 (FIG. 1). Winding 29s is connected to the controlled rectifiers, as shown, by diodes 181A through 186A and diodes 181B through 186B. Each controlled rectifier is energized by two phases of windings 29s to assure an adequate potential level over the time that each controlled rectifier may be turned on. If necessary, additional sources derived from source 18 (FIG. 1) may be connected into this circuit to provide a longer phase related time for energization of the controlled rectifiers.

Each of a group of unijunction transistors 231, 232, 233, 234, 235 and 236 is connected in the respective gating circuit of a related silicon controlled rectifier to provide a sharply defined gating pulse for its related silicon controlled rectifier. The silicon controlled rectifiers are turned on by a variably biased control signal passed through a unijunction transistor. The control signal is derived from secondary windings 250s and 160s. Windings 250s and 260s are coupled to primary windings 250p and 260p, respectively, which derive their energy from power source 18 (FIG. 1).

Control over the entire range of rectification and inversion is obtained by varying the rectifier direct current voltage over the complete range from maximum positive (rectification) to maximum negative (inversion). The voltage is varied over the required range by changing the phase control angle, i.e., the firing point of the mercury arc rectifiers in their respective voltage cycles over a range of nearly 180°. The firing of the mercury arc rectifier is controllable over this extended range as illustrated by angle y (FIG. 4a).

Figure 4:
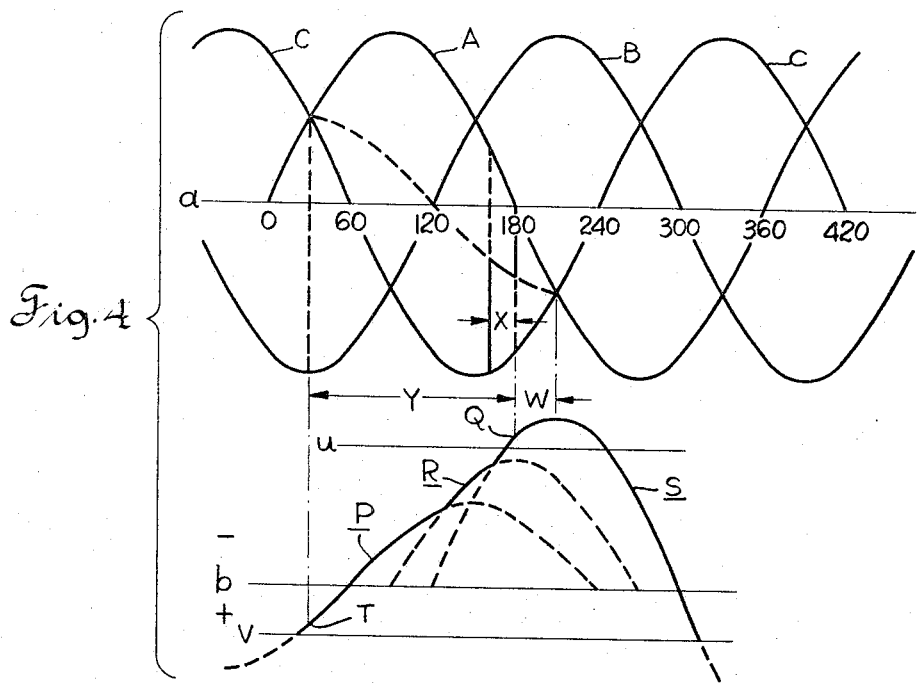
FIG. 4 is a drawing of characteristic curves that appear in the system.
Figure 5:
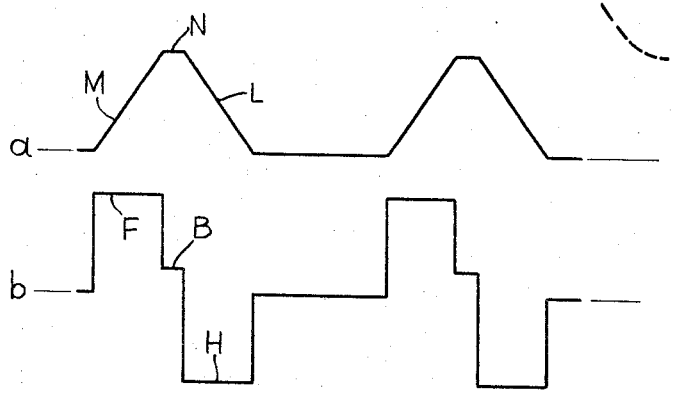
FIG. 5 is a drawing of characteristic curves appearing in the magnet winding power circuit.

Referring to FIG. 4, curve 4a illustrates three phase voltages, designated A, B and C, produced by winding 32A (FIG. 1). Curve 4b illustrates a control signal for controlling phase A. To explain the operation of the control circuitry, a typical phase such as phase A shown in curve 4a, its associated mercury arc rectifier 101 and its associated circuitry will be particularly described.

Mercury arc rectifier 101 is controlled by the circuitry comprising thyratron 71, transformer 141, silicon controlled rectifier 201, unijunction transistor 231, R-C circuit 241, diodes 261, 251A and 251B, and the variably biased control signal derived from windings 250s and 260s. The control signal is a composite signal made up of three separate sine waves of a selected and related amplitude and a selected phase relationship. The composite wave is biased by a fixed bias appearing across a potentiometer 272 and a controlled variable bias appearing across a resistor 293.

Windings 250s and 260s are connected to silicon controlled rectifier 201 through diodes 251A, 251B and 261 as shown. The phase relations and magnitudes of the voltages are such that the connections through the diodes provide a composite voltage wave as shown in FIG. 4b.

The composite wave is made of three sine waves, P, R and S, which are spaced 30° apart to provide a relatively long ramp (solid portion of curve) for furnishing a positive voltage for turning on the silicon controlled rectifier.

Since wave P is obtained through diode 251B, sine wave R through diode 261 and sine wave S through diode 251A. Sine wave P has approximately one-half the amplitude and sine wave R has approximately three-quarters the amplitude of sine wave S.

By utilizing the sine wave combination, the time range or angle over which a relatively steep slope of substantially increasing voltage is present extends over a range of nearly 180°. When a gating voltage is derived from a single sine wave the change of voltage per unit of time near the maximum positive and negative amplitude is relatively small and the desired accuracy is difficult to achieve. The relatively steep slope and greater range of the composite wave provides a sharper voltage change and therefore greater accuracy over the expanded range for turning on the silicon controlled rectifier.

Composite voltage wave PRS is delivered through a parallel R-C circuit 241. The resistance of the R-C circuit limits the current and the capacitor of the R-C circuit provides a pulse bypass. The voltage wave composite PRS and its biases are applied to the emitter of unijunction transistor 231.

Unijunction transistor 231 is biased by a source 275. When the composite wave is applied to the emitter, the unijunction transistor does not turn on until a selected proportion of the bias voltage is reached. At this point the unijunction conducts a pulse having a relatively sharp positive leading edge to the gating terminal of silicon controlled rectifier 201 through a current limiting resistor 211.

An equalizing resistor 221 connects the gating circuit to a point common to all the gating circuits. A diode 281 provides a bypass for preventing the application of any negative voltages to the unijunction transistor.

The gating circuit of the silicon controlled rectifiers is negatively biased at a fixed level by the voltage applied from potentiometer 272. This voltage provides a relative zero voltage for the sine wave illustrated in FIG. 4b as line u. The fixed bias is selected so that the sum of the voltages applied to the gating circuit of the silicon controlled rectifier provides a positive voltage (the intersection of line u and the composite wave) to turn on the silicon controlled rectifier. This positive voltage is applied to the gating terminal of the silicon controlled rectifier when the voltage reaches a level high enough to turn on the unijunction transistor. This level is illustrated as point Q, the time of turning on of the mercury arc rectifier. Point Q occurs slightly after the point of intersection of wave PRS and line u because of the selected delay resulting from the operation of the unijunction transistor. When operation is controlled by the fixed bias the mercury arc rectifiers are turned on in their related phases to operate as inverters.

The fixed bias is taken from a secondary winding 271s coupled to a primary winding 271p which is connected to power source 18 (FIG. 1). A capacitor 273 filters the ripple of the rectified output of a full wave rectifier 270.

A system control signal for varying the bias on the gating circuit is provided across terminals 292A and 292B which are connected to receive power from power source 18 (FIG. 1). This system control signal appears across terminals 292A and 292B to provide a relative zero voltage for the composite wave illustrated in FIG. 4b as line v. Line v illustrates the bias applied to the composite wave to turn on controlled rectifier 201 to provide rectification in the power circuit. The intersection of the composite wave and line v is the time at which the control signal becomes positive. Point T illustrates the time of firing of the mercury arc rectifier which is then operating as a rectifier. Point T is slightly delayed from the intersection because of the effect of the unijunction transistor.

Intermediate biases could be applied, if desired, to provide operation anywhere between maximum rectification and maximum inversion as illustrated by angle section Y is FIG. 4b.

During inverter operation, it is necessary to provide for commutation and deionization time when switching on the mercury arc rectifiers. With phase A, commutation and deionization must be completed before 210°, the point where phase A is no longer positive relative to phase C. Therefore, deionization and commutation time must be taken into account in determining the time of firing of the mercury arc rectifier. Deionization time is compensated for by controlling the bias illustrated by line $u$ to provide a time factor equal to a margin angle $w$. Commutation time is provided by controlling the bias illustrated by line $u$ to provide a time factor equal to a commutation angle $x$.

A minimum deionization time is selected for the minimum expected current conditions. Further adjustment is provided for by a current compensation means signal derived from a transductor 110 (FIG. 1), a potentiometer 291 and full wave rectifier 296. Transducer 110, shown as a current transformer, produces an output across terminals 111 and 112 (FIGS. 1 and 3) proportional to the current in the magnet windings. A diode 113 is connected between rectifier 296 and terminal 292A to prevent feedback from the current compensation means to the system control signal source.

The current compensation means provide the current compensation signal across resistor 293. This signal is filtered by a capacitor 295 and has the effect of moving line $u$ (FIG. 4a) downward relative to the composite wave as a function of the current through the rectifier power circuit. This moves the firing point to the left (earlier) to provide for increases in commutation and deionization time.

The current compensation signal does not affect the bias when the bias is at some minimum positive level, as at line $v$ for example, because it is applied parallel to, is of smaller value than, and has the same polarity as the variable bias during rectification operation. When the system control signal applied across resistor 293 from terminals 292A and 292B is positive, the positive potential of the current compensation signal from rectifier 296 has no effect. This is the situation for rectifier operation. However, when the system control signal is less positive than the current compensation signal from rectifier 296, the current compensation signal affects the bias on the gating circuits. This is the situation for inverter operation.

The firing time at point T, point Q or any intermediate point, is controlled by the fixed bias, the system control signal, the composite voltage wave and the current compensation signal when it is effective. The current compensation signal advances the firing from point T by an angle $x$ to allow for commutation of the current and deionization of the rectifier.

A blocking signal may be provided, if desired, to make the control circuit ineffective by applying a large negative bias to the gating circuits from a point 292C (FIG. 3). This voltage appears across a resistor 294 and has the effect of moving line $u$ (FIG. 4b) above the composite wave so that the sum of the voltages is never positive and the silicon controlled rectifiers are never turned on.

In describing the invention, the preferred embodiment has been shown and described, but it is obvious to one skilled in the art that there are many variations, combinations, alterations, and modifications that can be made without departing from the spirit of the invention, or from the scope of the appended claims.

The embodiments of the invention in which an exclusive property or privilege is claimed are defined as follows:

1. A system for controlling current between a polyphase power source and a load to provide rectification and inversion of the source comprising:
   means for producing an alternating control signal having a predetermined phase relationship to a phase of the source;
   controlled switching means responsive to a predetermined polarity change of a control signal connected between the source and the load to control the phase of the source;
   means connected to be combined with the control signal for variably biasing the control signal in response to a predetermined operating condition, said means comprising a fixed bias providing a polarity change to turn on the switching means to effect inversion of the source, and also comprising a controlled bias of a polarity opposite to the fixed bias providing a polarity change to turn on the switching means to effect rectification of the source; and
   means responsive to the current between the source and load and connected to provide a bias varying as a function of said current, said means connected to apply said current responsive bias in parallel with the controlled bias and the same polarity as the controlled bias, said current responsive bias having a potential less than the controlled bias thereby being ineffective during rectification operation and effective during inversion operation to provide for commutation and deionization time.

2. Means for controlling current between an alternating power source and a load comprising:
   means for producing a control signal made up of at least two alternating signals with each having a different amplitude and a predetermined phase relationship to a corresponding phase of the source and to each other to provide a composite wave form having continuously substantially changing voltage over an angle required for controlling the current;
   means for variably biasing the control signal; and
   controlled switching means connected between the source and the load responsive to the biased control signal to turn on at predetermined times in the cycle of the source.

3. Means for controlling according to claim 2 also comprising means responsive to the current between the power source and the load for further varying the bias of the control signal as a function of said current.

4. Means for controlling according to claim 3 wherein said means for variably biasing comprises two biases of opposite polarity with one bias periodically applied; and wherein said means for further varying the bias comprises a direct voltage source varying as a function of said current and having the same polarity as the portion of the bias periodically applied by the means for variably biasing the control signal, said direct voltage applied in the circuit to be ineffective during the period of said periodically applied portion of the variable bias.

5. Means for controlling current between an alternating power source and a load over the full range of rectification and inversion comprising:
   means for producing a control signal made up of at least two alternating signals with each having a different amplitude and a predetermined phase relationship to a corresponding phase of the source and to each other to provide a composite wave form having a continuously substantially changing voltage over an angle required for controlling the current between the source and load;
   means for variably biasing the control signal, said means comprising a fixed bias for effecting maximum inversion operation and a controlled bias for effecting less than maximum inversion operation and rectification operation;

controlled switching means connected to control current between the source and the load responsive to the biased control signal to turn on at predetermined times; and means responsive to the current between the source and the load for varying only the fixed bias applied to the control signal as a function of said current.

6. Means for controlling according to claim 5 wherein said means for varying only the fixed bias comprises a direct voltage of the same polarity as the controlled bias and connected to apply said direct voltage in parallel with said controlled bias.

7. Means for controlling current between an alternating power source and a load comprising:

controlled rectifier means connected between the source and the load;

means for producing a control signal comprising at least two alternating signals with each having a different amplitude and a predetermined phase relationship to the corresponding phase of the source and to each other to provide a changing voltage of significant slope over an angle required for controlling the current between the source and load;

means connected to be combined with the control signal for variably biasing the control signal; and means responsive to the biased control signal for turning on the controlled rectifier means at predetermined times in the cycle of the alternating source.

8. Means for controlling current between an alternating power source and a load comprising:

controlled rectifier means connected between the source and the load;

means for producing a control signal comprising at least two alternating signals with each having a different amplitude and a predetermined phase relationship to the corresponding phase of the source and to each other to provide a changing voltage of significant slope over an angle required for controlling the source;

means connected to be combined with the control signal for variably biasing the control signal;

means responsive to the biased control signal for turning on the controlled rectifier means at predetermined times in the cycle of the alternating source; and means responsive to the current between the source and the load for further varying the bias of the control signal only over a portion of the angle required as a function of said current.

9. A system for controlling current between a polyphase power source and a load, said system having control means with separate circuits for respectively controlling each phase of the source, each of said circuits comprising:

a control signal comprising at least two alternating signals each having a different amplitude and a predetermined phase relationship to a corresponding phase of the source and to each other to provide a changing voltage of significant slope over an angle required for controlling the controlled phase of the source;

means connected to be combined with the control signal for variably biasing the control signal; and controlled rectifier means connected between the corresponding phase of the source and the load and responsive to the biased control signal to turn on at predetermined times to provide a full range of rectification and inversion of the controlled phase.

10. A system for controlling current between a polyphase power source and a load, said system having control means with separate circuits for respectively controlling each phase of the source, each of said circuits comprising:

a control signal comprising at least two alternating signals each having a different amplitude and a predetermined phase relationship to a corresponding phase of the source and to each other to porvide a changing voltage of significant slope over an angle required for controlling the controlled phase of the source;

means connected to be combined with the control signal for variably biasing the control signal to provide a pulse varying over the angle required in response to predetermined operating conditions;

controlled rectifier means connected between the corresponding phase of the source and the load and responsive to the pulse to turn on to provide a full range of rectification and inversion of the corresponding phase; and means responsive to the current between the source and the load for further varying the biasing of the control signal as a function of said current, said means connected to be effective only over the range of rectification operation.

11. A system according to claim 10 wherein said means for variably biasing comprises means for providing a fixed bias for effecting inversion operation and a controlled bias applied in a polarity opposite to said fixed bias for effecting rectification operation, and wherein said means for further varying applies a direct voltage varying as a function of the current for further varying the bias with said direct voltage applied with the same polarity as and in parallel with the controlled bias.

12. A system for controlling current between a polyphase power source and a reactive load, said system having control means with separate interconnected circuits for respectively controlling each phase of the source, each of said circuits comprising:

controlled rectifier means connected in a controlled phase between the source and the load;

means for producing a control signal comprising a first, second and third alternating signal each having a different amplitude and a different predetermined phase relationship to the corresponding phase of the source and a predetermined relationship to each other to provide a substantially continuously rising voltage of significant slope over an angle required for turning on the controlled phase of the source, means connected to be combined with the control signal for variably biasing the control signal in response to a predetermined operating condition; and means responsive to the biased control signal for turning on the controlled rectifier means at predetermined times in the cycle of its controlled phase to provide for current control over the range of full rectification and maximum possible inversion.

13. A system for controlling current through a reactive load comprising:

a polyphase power source connected to the primary windings of a polyphase power transformer, said power transformer comprising secondary windings to provide a multiple phase output;

controlled rectifiers individually connected between a phase of the secondary windings and the load;

means for producing alternating control signals each having a predetermined phase relationship to a corresponding phase of the output of the secondary windings, each of said alternating signals comprising a plurality of overlapping sine waves displaced angularly from each other by a predetermined amount with each subsequent sine wave having an increased amplitude relative to the preceding sine wave, said sine waves connected in circuitry to combine the voltage of said plurality of sine waves to provide a substantially rising voltage over a range of the corresponding phase that enables full rectification and maximum possible inversion of the corresponding phase of the source;

a fixed direct voltage source connected to bias the control signals to have the control signal become positive at a point in the cycle of the corresponding phase related to maximum inversion operation;

a controlled direct voltage source connected to bias the control signals, said direct voltage source varying in accordance with operating conditions having an applied polarity opposite to the fixed bias to vary the time in the cycle of the corresponding phase that the biased control signal becomes positive; and means responsive to the change to positive of the biased control signals to turn on the controlled rectifier controlling the corresponding phase.

14. A system according to claim 13 also comprising means responsive to the current between the source and the load for applying a current compensation bias varying as a function of the current between the source and the load to the control signal, said means for applying a current compensation bias connected to apply said current compensation bias parallel to and with the same polarity as the controlled direct voltage source.

15. A system for controlling current through the magnet windings of a particle accelerator comprising:

a polyphase power source connected to the primary windings of a polyphase power transformer, said power transformer having secondary windings to provide a multiple phase output;

mercury arc rectifiers each individually connected to control current between a phase of the secondary windings and the circuit of the magnet windings;

means for producing alternating current control signals each having a predetermined phase relationship to a corresponding phase of the output of the secondary windings, each of said alternating current signals comprising a plurality of overlapping sine waves displaced angularly from each other by a predetermined amount with each subsequent sine wave having an increased amplitude relative to the preceding sine wave, said sine waves connected in circuitry to combine the voltage of said plurality of said sine waves to provide a substantially rising voltage over the required control range of the corresponding phase;

a fixed direct voltage source connected to negatively bias the control signals to provide a change of polarity of the control signals at inversion related times in the cycle of the corresponding phase;

a controlled direct voltage source connected to positively bias the control signals to provide a change of polarity of the control signals at rectification related times in the cycle of the corresponding phase, said controlled direct voltage source varying in accordance with a predetermined sequence related to the acceleration of the particles in the particle accelerator; and controlled switching devices each connected between a source of electrical energy derived from the power source and the control grids of the mercury arc rectifiers and responsive to the biased control signal to turn on the mercury arc rectifiers.

16. A system according to claim 15 also comprising a third direct voltage source having a voltage varying as a function of the current between the source and the load, said third direct voltage source connected to have the same polarity as the controlled direct voltage source and connected to be applied parallelly to the controlled direct voltage source.

References Cited

UNITED STATES PATENTS 2,427,738   9/1947   Pakala et al. _____ 315—194 X

MILTON O. HIRSHFIELD, *Primary Examiner.*

LEE T. HIX, *Examiner.*